US012808244B2

(12) United States Patent
Sato et al.

(10) Patent No.: US 12,808,244 B2
(45) Date of Patent: Nov. 24, 2026

(54) SLIDING DOOR SUPPORT DEVICE

(71) Applicant: AISIN CORPORATION, Kariya (JP)

(72) Inventors: Eisuke Sato, Kariya (JP); Yuta Fukami, Kariya (JP); Taisuke Yamamoto, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/877,034

(22) PCT Filed: Oct. 19, 2023

(86) PCT No.: PCT/JP2023/037908
§ 371 (c)(1),
(2) Date: Dec. 19, 2024

(87) PCT Pub. No.: WO2024/085236
PCT Pub. Date: Apr. 25, 2024

(65) Prior Publication Data

US 2025/0376882 A1 Dec. 11, 2025

(30) Foreign Application Priority Data

Oct. 20, 2022 (JP) ................................ 2022-168606

(51) Int. Cl.
*E05D 15/10* (2006.01)
*B60J 5/06* (2006.01)

(52) U.S. Cl.
CPC ............ *E05D 15/1047* (2013.01); *B60J 5/06* (2013.01); *E05D 15/101* (2013.01);
(Continued)

(58) Field of Classification Search
CPC ............ E05D 15/1047; E05D 15/1044; E05D 2015/1055; E05D 2015/1057; E05D 15/101; B60J 5/06; B60J 5/062
See application file for complete search history.

(56) References Cited

U.S. PATENT DOCUMENTS 11,585,137 B2 * 2/2023 Zindler .................. E05D 15/58
2010/0289299 A1 * 11/2010 Kitayama ........... E05D 15/1047
49/213
2020/0149331 A1 * 5/2020 Kiryu ........................ E05F 1/16

FOREIGN PATENT DOCUMENTS

EP 1 745 958 A2 1/2007
FR 2 779 996 A1 12/1999
(Continued)

OTHER PUBLICATIONS

Dec. 22, 2025 Extended European Search Report issued in European Patent Application No. 23879879.7.

*Primary Examiner* — Marcus Menezes
(74) *Attorney, Agent, or Firm* — Oliff PLC

(57) ABSTRACT

A sliding door support device includes a guide rail extending in a front-rear direction, and a roller unit moving along the guide rail. In a case where the sliding door moves between a fully closed position and a fully open position, the roller unit is configured to maintain a state where a hinge axis is positioned in an opening direction with respect to a rotation axis of a guide roller regardless of the position of the sliding door. The guide rail includes a first curved portion that is curved inward in a width direction of a vehicle as proceeding in a closing direction, and a second curved portion that is curved outward in the width direction as proceeding in the closing direction from an end of the first curved portion in the closing direction.

13 Claims, 8 Drawing Sheets

(52) U.S. Cl.
CPC ................ *E05D 2015/1049* (2013.01); *E05D 2015/1055* (2013.01); *E05D 2015/1057* (2013.01); *E05Y 2201/624* (2013.01); *E05Y 2600/626* (2013.01); *E05Y 2900/531* (2013.01)

(56) References Cited

FOREIGN PATENT DOCUMENTS

| | | | |
|---|---|---|---|
| JP | 2008-285964 | A | 11/2008 |
| JP | 2018-080468 | A | 5/2018 |
| JP | 2022-038815 | A | 3/2022 |
| WO | 2021/003220 | A1 | 1/2021 |

* cited by examiner

SLIDING DOOR SUPPORT DEVICE

TECHNICAL FIELD

The present disclosure relates to a sliding door support device.

BACKGROUND ART

Patent Literature 1 describes a vehicle including a vehicle body having a door opening, a sliding door that opens and closes the door opening, and a sliding door support device that supports the sliding door with respect to the vehicle body. The sliding door support device includes an elongated guide rail fixed to the vehicle body, and a roller unit that moves along the guide rail while being fixed to the sliding door.

When the roller unit moves to the front end of the guide rail, the sliding door is disposed at a fully closed position where the sliding door fully closes the door opening. On the other hand, when the roller unit moves to the rear end of the guide rail, the sliding door is disposed at a fully open position where the sliding door fully opens the door opening. In this manner, the sliding door moves between the fully closed position and the fully open position by the roller unit moving along the guide rail.

CITATION LIST

Patent Literature

Patent Literature 1: JP 2022-38815 A

SUMMARY OF DISCLOSURE

Technical Problems

In the vehicle described above, when the sliding door is disposed at the fully open position, if the sliding door and the door opening largely overlap each other in a front-rear direction, there is a possibility that the convenience of a user getting on and off the vehicle through the door opening is degraded.

Solutions to Problems

A sliding door support device according to one aspect of the present disclosure is applied to a vehicle including a vehicle body having a door opening that is open to a side surface, and a sliding door configured to move between a fully closed position where the door opening is fully closed and a fully open position where the door opening is fully opened, and is configured to cause the vehicle body to support the sliding door. Among directions along a front-rear direction of the vehicle, a direction in which the sliding door moves to the fully closed position is a closing direction, and a direction in which the sliding door moves to the fully open position is an opening direction. The sliding door support device includes a guide rail extending in the front-rear direction, and a roller unit configured to move the sliding door between the fully closed position and the fully open position by moving along the guide rail. The roller unit includes: two guide rollers configured to roll on the guide rail in a state of being arranged in the front-rear direction; a door bracket fixed to the sliding door; and a coupling portion configured to be coupled to the door bracket so as to rotate relative to the door bracket about a hinge axis extending in a vertical direction, and to rotatably support the two guide rollers, and in a case where the sliding door moves between the fully closed position and the fully open position, the roller unit is configured so that a state where the hinge axis is positioned in the opening direction with respect to a rotation axis of at least one of the two guide rollers regardless of a position of the sliding door is maintained. The guide rail includes a first curved portion that is curved inward in a width direction of the vehicle as proceeding in the closing direction, and a second curved portion that is curved outward in the width direction as proceeding in the closing direction from an end of the first curved portion in the closing direction.

DESCRIPTION OF EMBODIMENTS

First Embodiment

A first embodiment of a vehicle including a sliding door support device (hereinafter, referred to as "door support device") will be described.

Configuration of First Embodiment

Figure 1:
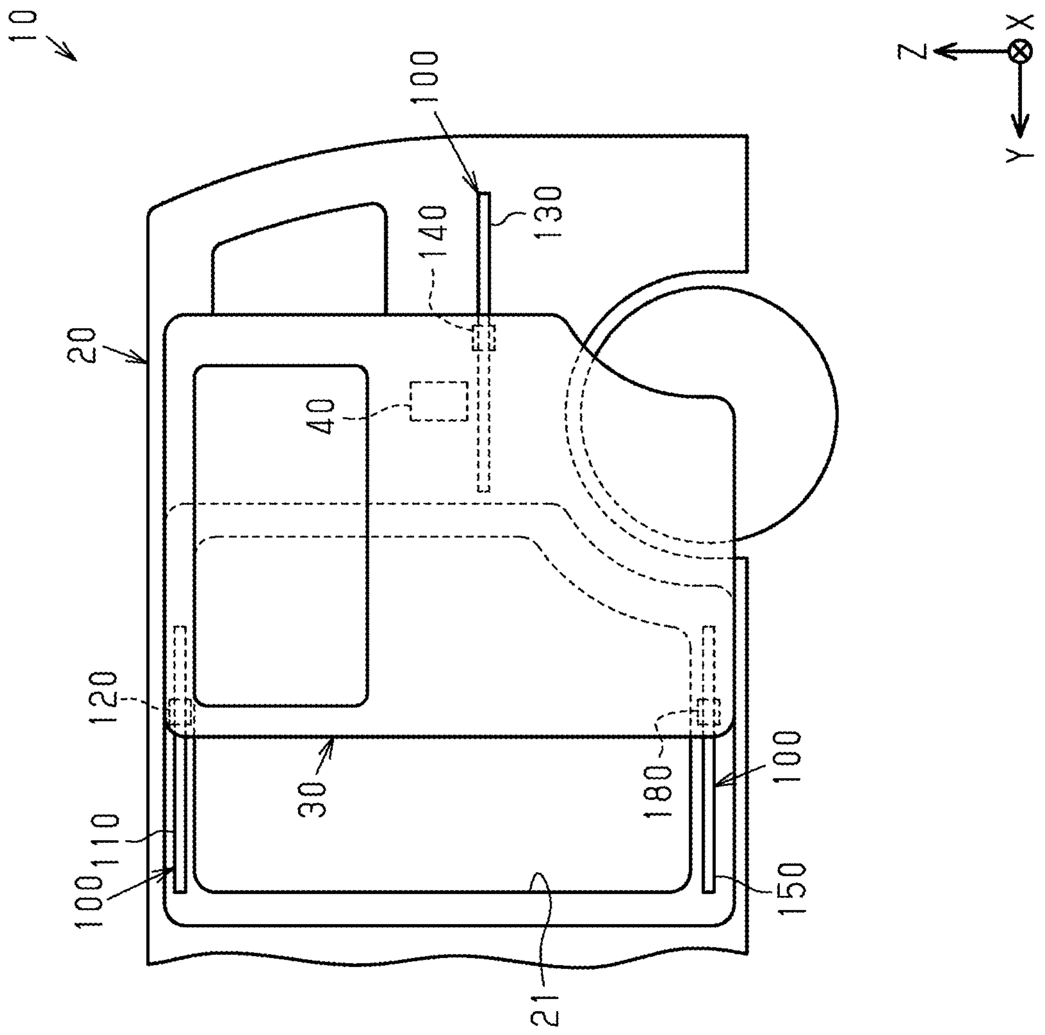
FIG. 1 is a side view of a vehicle including a sliding door support device according to a first embodiment.

As illustrated in FIG. 1, a vehicle 10 includes a vehicle body 20, a sliding door 30, a door drive device 40, and a door support device 100. In the following description, the width direction of the vehicle 10, the front-rear direction of the vehicle 10, and the vertical direction of the vehicle 10 are simply referred to as a width direction, a front-rear direction, and a vertical direction, respectively. The width direction is a direction in which the X axis extends, the front-rear direction is a direction in which the Y axis extends, and the vertical direction is a direction in which the Z axis extends. Furthermore, in the width direction, the direction toward the center of the vehicle 10 is referred to as inward, and the direction away from the center of the vehicle 10 is referred to as outward.

<Vehicle Body 20>

The vehicle body 20 has a door opening 21 that opens to a side surface. The door opening 21 is a portion through which a user who gets on and off a rear seat passes. When viewed in the width direction, the door opening 21 has a rectangular shape. The lateral direction of the door opening 21 is the front-rear direction, and the longitudinal direction of the door opening 21 is the vertical direction. In the first embodiment, the front end of the door opening 21 is partitioned by a B pillar of the vehicle body 20.

<Sliding Door 30>

The sliding door 30 has a shape corresponding to the door opening 21. The sliding door 30 moves between a fully closed position where the door opening 21 is fully closed and a fully open position where the door opening 21 is fully opened. The closing direction and the opening direction of the sliding door 30 are directions along the front-rear direction. Specifically, the closing direction of the sliding door 30 is forward, and the closing direction of the sliding door 30 is rearward. When the sliding door 30 is opened, the sliding door moves rearward while moving outward in the width direction from the fully closed position in order to avoid interference with the vehicle body 20. For this reason, the sliding door 30 disposed at the fully open position is located rearward and outward in the width direction with respect to the sliding door 30 disposed at the fully closed position.

<Door Support Device 100>

As illustrated in FIG. 1, the door support device 100 includes an upper rail 110, an upper roller unit 120, a center rail 130, a center roller unit 140, a lower rail 150, and a lower roller unit 180.

In the first embodiment, the upper rail 110 and the center rail 130 have similar configurations, and the upper roller unit 120 and the center roller unit 140 have similar configurations. For this reason, the upper rail 110 and the center rail 130, and the upper roller unit 120 and the center roller unit 140 will be collectively described. The lower rail 150 corresponding to "guide rail" and the lower roller unit 180 corresponding to "roller unit" will be individually described.

<Upper Rail 110 and Center Rail 130>

As illustrated in FIG. 1, the upper rail 110 is fixed above the door opening 21 on the side surface of the vehicle body 20. On the other hand, the center rail 130 is fixed, on the side surface of the vehicle body 20, at a position rearward from the central portion of the door opening 21 in the vertical direction.

Figure 2:
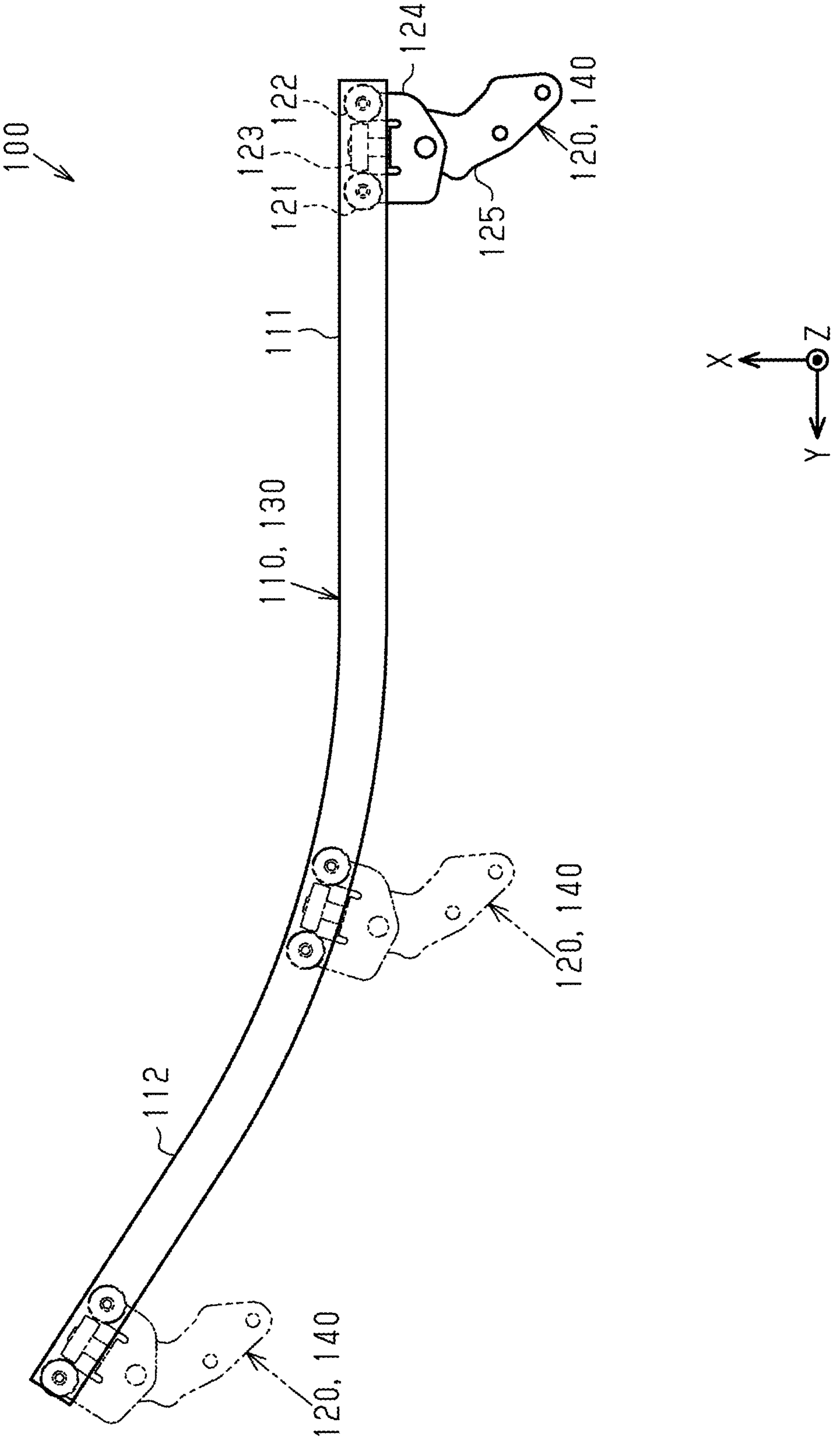
FIG. 2 is a plan view of an upper rail and an upper roller unit (center rail and center roller unit) of the sliding door support device illustrated in FIG. 1.

As illustrated in FIG. 2, the upper rail 110 and the center rail 130 have an elongated shape that is long in the front-rear direction. The upper rail 110 and the center rail 130 have a straight portion 111 and a curved portion 112. The straight portion 111 extends linearly along the front-rear direction. The curved portion 112 is curved inward in the width direction as proceeding forward from the front end of the straight portion 111. Note that the longitudinal direction of the straight portion 111 may be slightly inclined with respect to the front-rear direction, and the straight portion 111 may be slightly curved. The shapes of the straight portion 111 and the curved portion 112 of the upper rail 110 are not necessarily the same as the shapes of the straight portion 111 and the curved portion 112 of the center rail 130. For example, it is preferable that the curved portion 112 of the center rail 130 have a smaller inward curved amount in the width direction than the curved portion 112 of the upper rail 110.

<Upper Roller Unit 120 and Center Roller Unit 140>

As illustrated in FIG. 1, the upper roller unit 120 is fixed to an upper portion of the front end of the sliding door 30. The center roller unit 140 is fixed to a central portion in the vertical direction of the rear end of the sliding door 30.

As illustrated in FIG. 2, the upper roller unit 120 and the center roller unit 140 have two guide rollers 121 and 122, a support roller 123, a roller support portion 124, and a door bracket 125.

The guide rollers 121 and 122 are rollers that define the moving direction of the sliding door 30. The support roller 123 is a roller that supports the weight of the sliding door 30. The roller support portion 124 rotatably supports the two guide rollers 121 and 122 and the support roller 123. At this time, the rotation axes of the two guide rollers 121 and 122 extend in the vertical direction, and the rotation axis of the support roller 123 is orthogonal to the rotation axes of the two guide rollers 121 and 122. In addition, the support roller 123 is located between the two guide rollers 121 and 122. The roller support portion 124 is coupled to the door bracket 125 so as to be relatively rotatable. The roller support portion 124 is rotatable about an axis extending in the vertical direction with respect to the door bracket 125. The door bracket 125 is a portion fixed to the sliding door 30. Specifically, the door bracket 125 of the upper roller unit 120 is fixed to the upper portion of the front end of the sliding door 30. The door bracket 125 of the center roller unit 140 is fixed to the central portion in the vertical direction of the rear end of the sliding door 30.

The two guide rollers 121 and 122 and the support roller 123 of the upper roller unit 120 are engaged with the upper rail 110. The two guide rollers 121 and 122 and the support roller 123 of the upper roller unit 120 can thus roll on the upper rail 110. Similarly, the two guide rollers 121 and 122 and the support roller 123 of the center roller unit 140 are engaged with the center rail 130. The two guide rollers 121 and 122 and the support roller 123 of the center roller unit 140 can thus roll on the center rail 130.

<Lower Rail 150>

Figure 3:
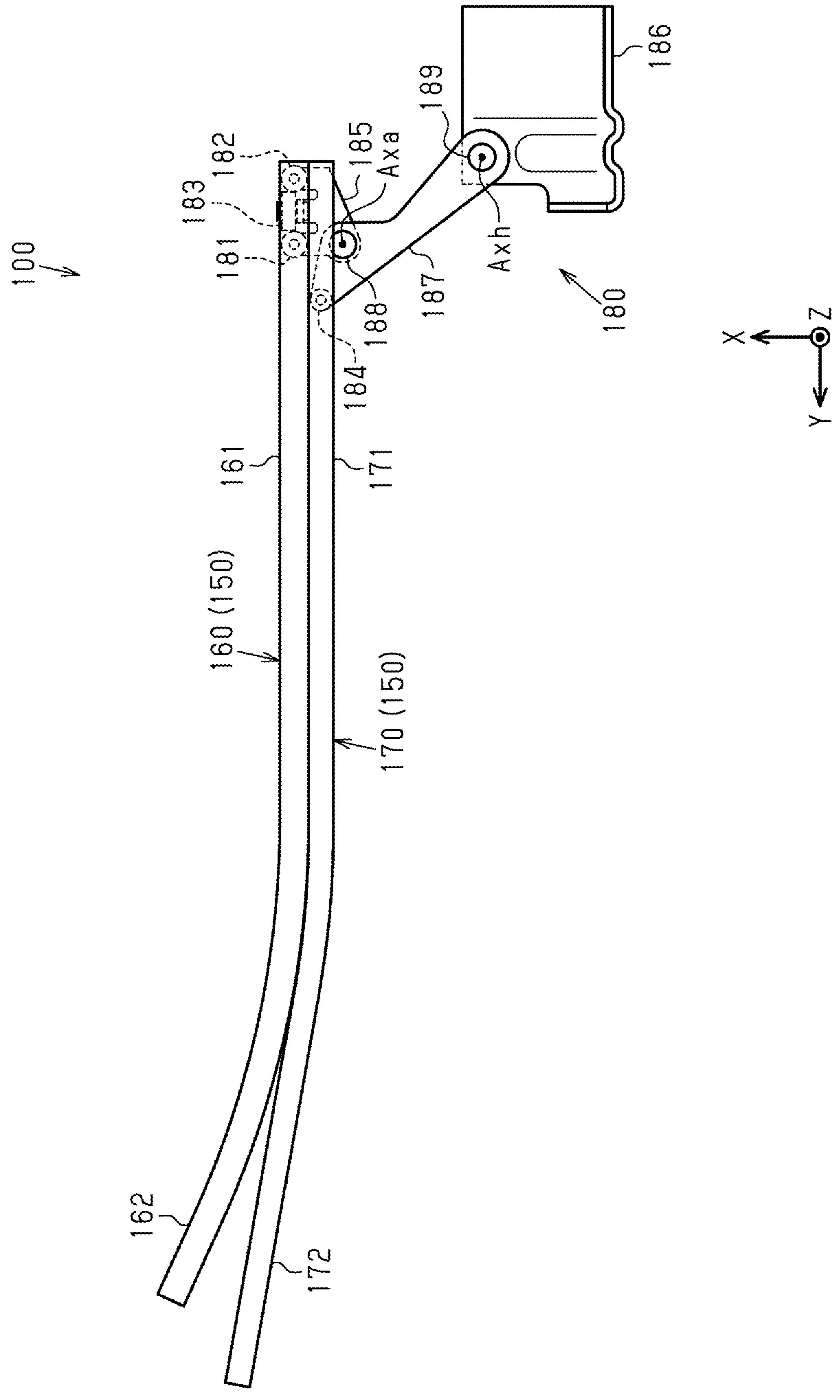
FIG. 3 is a plan view of a lower rail and a lower roller unit of the sliding door support device illustrated in FIG. 1.
Figure 4:
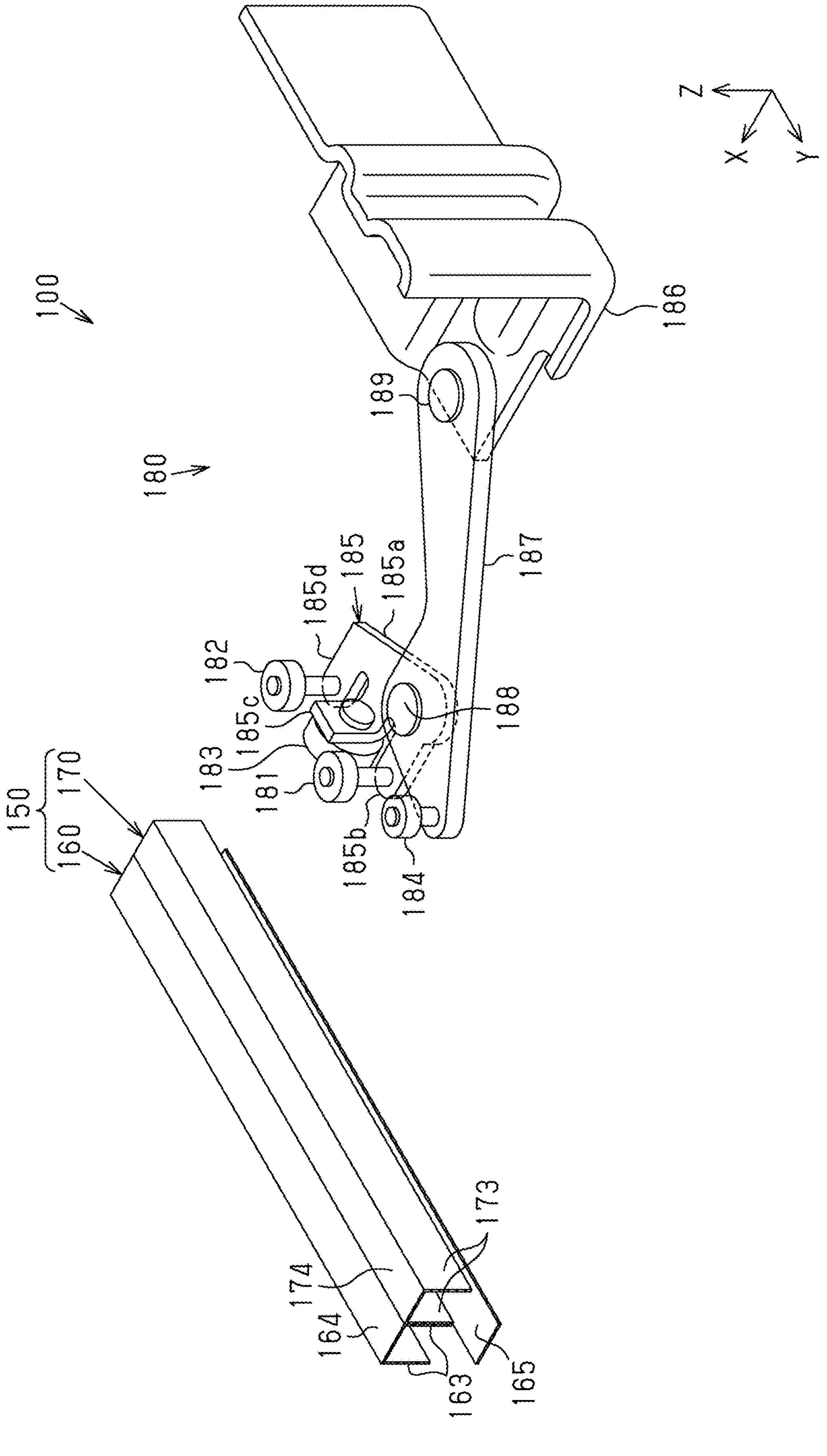
FIG. 4 is a perspective view of the lower rail and the lower roller unit of the sliding door support device illustrated in FIG. 1.

As illustrated in FIG. 1, the lower rail 150 is fixed below the door opening 21 on the side surface of the vehicle body 20. As illustrated in FIGS. 3 and 4, the lower rail 150 includes a first rail 160 and a second rail 170. The first rail 160 and the second rail 170 have an elongated shape that is long in the front-rear direction. The longitudinal direction of the first rail 160 and the second rail 170 is the front-rear direction. The first rail 160 and the second rail 170 are arranged adjacent to each other in the width direction. The first rail 160 is located inward in the width direction with respect to the second rail 170. The rear end of the first rail 160 matches the rear end of the second rail 170, but the front end of the first rail 160 is located rearward of the front end of the second rail 170.

The first rail 160 includes a first straight portion 161 extending along the front-rear direction, and a first curved portion 162 curved inward in the width direction as proceeding forward from the front end of the first straight portion 161. Similarly, the second rail 170 includes a second straight portion 171 extending along the front-rear direction, and a second curved portion 172 curved inward in the width direction as proceeding forward from the front end of the second straight portion 171. Note that the first curved portion 162 and the second curved portion 172 are only required to extend continuously from the front ends of the first straight portion 161 and the second straight portion 171, respectively, and extend inward in the width direction with respect to the front ends of the first straight portion 161 and the second straight portion 171, respectively. Therefore, for example, as illustrated in the drawing, the first curved portion 162 does not need to include a linearly extending portion, and the second curved portion 172 may include a linearly extending portion.

The first straight portion 161 extends in the same direction as the second straight portion 171. On the other hand, the first curved portion 162 extends in a direction different from that of the second curved portion 172. Specifically, the first curved portion 162 extends inward in the width direction with respect to the second curved portion 172. In other words, the first curved portion 162 is curved more inward in the width direction toward the closing direction than the second curved portion 172. The first straight portion 161 and the second straight portion 171 are in close contact with each other in the width direction, while the first curved portion 162 and the second curved portion 172 are separated from each other in the width direction. Furthermore, the interval in the width direction between the first curved portion 162 and the second curved portion 172 increases as proceeding forward. Therefore, the interval in the width direction between the first rail 160 and the second rail 170 is different between the end in the opening direction and the end in the closing direction.

Here, the degree of inward curving of the first rail 160 and the second rail 170 in the width direction is smaller than the degree of inward curving of the upper rail 110 and the center rail 130 in the width direction. In this manner, the length of the lower rail 150 in the width direction is shorter than the length of the upper rail 110 and the center rail 130 in the width direction.

As illustrated in FIG. 4, the first straight portion 161 and the first curved portion 162 constituting the first rail 160 have two side walls 163 facing each other in the width direction, an upper wall 164 connecting upper ends of the two side walls 163, and a bottom wall 165 located below the upper wall 164. In the first embodiment, the bottom wall 165 is configured separately from the two side walls 163 and the upper wall 164, but in another embodiment, the bottom wall 165 may be connected to the lower end of one side wall 163. The second straight portion 171 and the second curved portion 172 constituting the second rail 170 have two side walls 173 facing each other in the width direction and an upper wall 174 connecting upper ends of the two side walls 173.

<Lower Roller Unit 180>

As illustrated in FIG. 1, the lower roller unit 180 is fixed to a lower portion of the front end of the sliding door 30. As illustrated in FIGS. 3 and 4, the lower roller unit 180 includes two first guide rollers 181 and 182, a support roller 183, a second guide roller 184, a roller support portion 185, a door bracket 186, a coupling arm 187, and two coupling pins 188 and 189. In the first embodiment, a "coupling portion" includes the roller support portion 185 and the coupling arm 187.

The roller support portion 185 has a plate shape. The roller support portion 185 includes a base portion **185*a* and three extending portions 185*b* to 185*d* extending from the base portion 185*a*. The three extending portions 185*b* to 185*d* extend from one side of the base portion 185*a* at intervals between the extending portions 185*b* to 185*d*. The three extending portions 185*b* to 185*d* are thus arranged in a line. Among the three extending portions 185*b* to 185*d*, the two extending portions 185*b* and 185*d* located at both ends rotatably support the two first guide rollers 181 and 182, respectively. The rotation axes of the two first guide rollers 181 and 182 extend in the vertical direction. Among the three extending portions 185*b* to 185*d*, the distal end portion of the extending portion 185*c* located at the center is bent upward. The distal end portion of the extending portion 185*c* located at the center rotatably supports the support roller 183. That is, the support roller 183 is located between the two first guide rollers 181 and 182. The rotation axis of the support roller 183 is orthogonal to the rotation axes of the two first guide rollers 181 and 182**.

The door bracket 186 is a plate-like member bent in an "L" shape when viewed in the front-rear direction. The door bracket 186 is fixed to the lower portion of the front end of the sliding door 30.

The coupling arm 187 is an elongated plate-like link member. The proximal end portion of the coupling arm 187 in the longitudinal direction is coupled to the roller support portion 185 by the coupling pin 188 extending in the vertical direction. The coupling arm 187 is thus rotatable relative to the roller support portion 185 about a rotation axis extending in the vertical direction. On the other hand, the distal end portion of the coupling arm 187 in the longitudinal direction is coupled to the door bracket 186 by the coupling pin 189 extending in the vertical direction. The coupling arm 187 is thus rotatable relative to the door bracket 186 about a rotation axis extending in the vertical direction. In this manner, the coupling arm 187 couples the roller support portion 185 and the door bracket 186 to each other. In the following description, the rotation axis of the coupling arm 187 and the roller support portion 185 is referred to as an "arm axis Axa", and the rotation axis of the coupling arm 187 and the door bracket 186 is referred to as a "hinge axis Axh". Since both the arm axis Axa and the hinge axis Axh extend in the vertical direction, these axes are parallel to each other. In addition, when the lower roller unit 180 is viewed from above, the direction in which the coupling arm 187 rotates clockwise with respect to the roller support portion 185 is referred to as a first rotation direction R1, and the direction in which the coupling arm 187 rotates counterclockwise with respect to the roller support portion 185 is referred to as a second rotation direction R2.

The coupling arm 187 rotatably supports the second guide roller 184 at a position close to the proximal end portion. The rotation axis of the second guide roller 184 extends in the vertical direction. The rotation axis of the second guide roller 184 is shifted from the arm axis Axa. Specifically, in the longitudinal direction of the coupling arm 187, the arm axis Axa is positioned between the hinge axis Axh and the rotation axis of the second guide roller 184. In other words, in the longitudinal direction of the coupling arm 187, the hinge axis Axh and the rotation axis of the second guide roller 184 are positioned on both sides with the arm axis Axa interposed therebetween. Here, the description that the arm axis Axa is positioned between the hinge axis Axh and the rotation axis of the second guide roller 184 includes a case where the arm axis Axa is positioned to be shifted from a line segment connecting the hinge axis Axh and the rotation axis of the second guide roller 184 when viewed in the vertical direction.

For this reason, in a case where the coupling arm 187 rotates about the arm axis Axa, the moving direction of the rotation axis of the second guide roller 184 and the moving direction of the hinge axis Axh are opposite to each other. Furthermore, the distance from the arm axis Axa to the rotation axis of the second guide roller 184 is shorter than the distance from the arm axis Axa to the hinge axis Axh. Therefore, in a case where the coupling arm 187 rotates about the arm axis Axa, the movement amount of the rotation axis of the second guide roller 184 is less than the movement amount of the hinge axis Axh.

The two first guide rollers 181 and 182 and the support roller 183 of the lower roller unit 180 are engaged with the first rail 160 of the lower rail 150. Specifically, the two first guide rollers 181 and 182 are in contact with either of the two side walls 163 of the first rail 160, and the support roller 183 is in contact with the bottom wall 165 of the first rail 160. The two first guide rollers 181 and 182 and the support roller 183 of the lower roller unit 180 can thus roll on the first rail 160 of the lower rail 150. The two first guide rollers 181 and 182 are arranged to be spaced apart from each other in the longitudinal direction of the first rail 160. In other words, the two first guide rollers 181 and 182 are arranged to be spaced apart from each other in the front-rear direction. Among the two first guide rollers 181 and 182, the first guide roller 181 located in the closing direction corresponds to a "close-side first guide roller", and the first guide roller 182 located in the opening direction corresponds to an "open-side first guide roller".

The second guide roller 184 of the lower roller unit 180 is engaged with the second rail 170 of the lower rail 150. Specifically, the second guide roller 184 is in contact with either of the two side walls 173 of the second rail 170. The second guide roller 184 of the lower roller unit 180 can thus roll on the second rail 170 of the lower rail 150.

As illustrated in FIG. 3, the lower roller unit 180 is engaged with the first rail 160 and the second rail 170 from below. For this reason, the installation positions of the roller support portion 185, the door bracket 186, and the coupling arm 187 are shifted downward from the installation positions of the first rail 160 and the second rail 170. In another embodiment, the lower roller unit 180 may be engaged with the first rail 160 and the second rail 170 from above. In this case, the installation positions of the roller support portion 185, the door bracket 186, and the coupling arm 187 are shifted upward from the installation positions of the first rail 160 and the second rail 170.

Operation of First Embodiment

Hereinafter, an operation when the sliding door 30 is closed will be described. Specifically, actions of the upper roller unit 120, the center roller unit 140, and the lower roller unit 180 when the sliding door 30 is closed will be described.

The action of the upper roller unit 120 will be described.

As indicated by solid lines in FIG. 2, in a case where the sliding door 30 is disposed at the fully open position, the upper roller unit 120 is located near the rear end of the upper rail 110. At this time, the door bracket 125 of the upper roller unit 120 is located rearmost and outermost in the width direction.

In a case where the sliding door 30 is closed from the fully open position, the upper roller unit 120 moves from the rear end toward the front end of the upper rail 110. At this time, the two guide rollers 121 and 122 and the support roller 123 of the upper roller unit 120 roll on the upper rail 110. In a case where the two guide rollers 121 and 122 move along the straight portion 111 of the upper rail 110, the relative positional relationship between the roller support portion 124 and the door bracket 125 does not substantially change. On the other hand, in a case where the two guide rollers 121 and 122 move along the curved portion 112 of the upper rail 110, the roller support portion 124 rotates relative to the door bracket 125.

Although the action of the upper roller unit 120 in the case of closing the sliding door 30 has been described above, the action of the center roller unit 140 in the case of closing the sliding door 30 is substantially similar.

The action of the lower roller unit 180 will be described.

Figure 5:
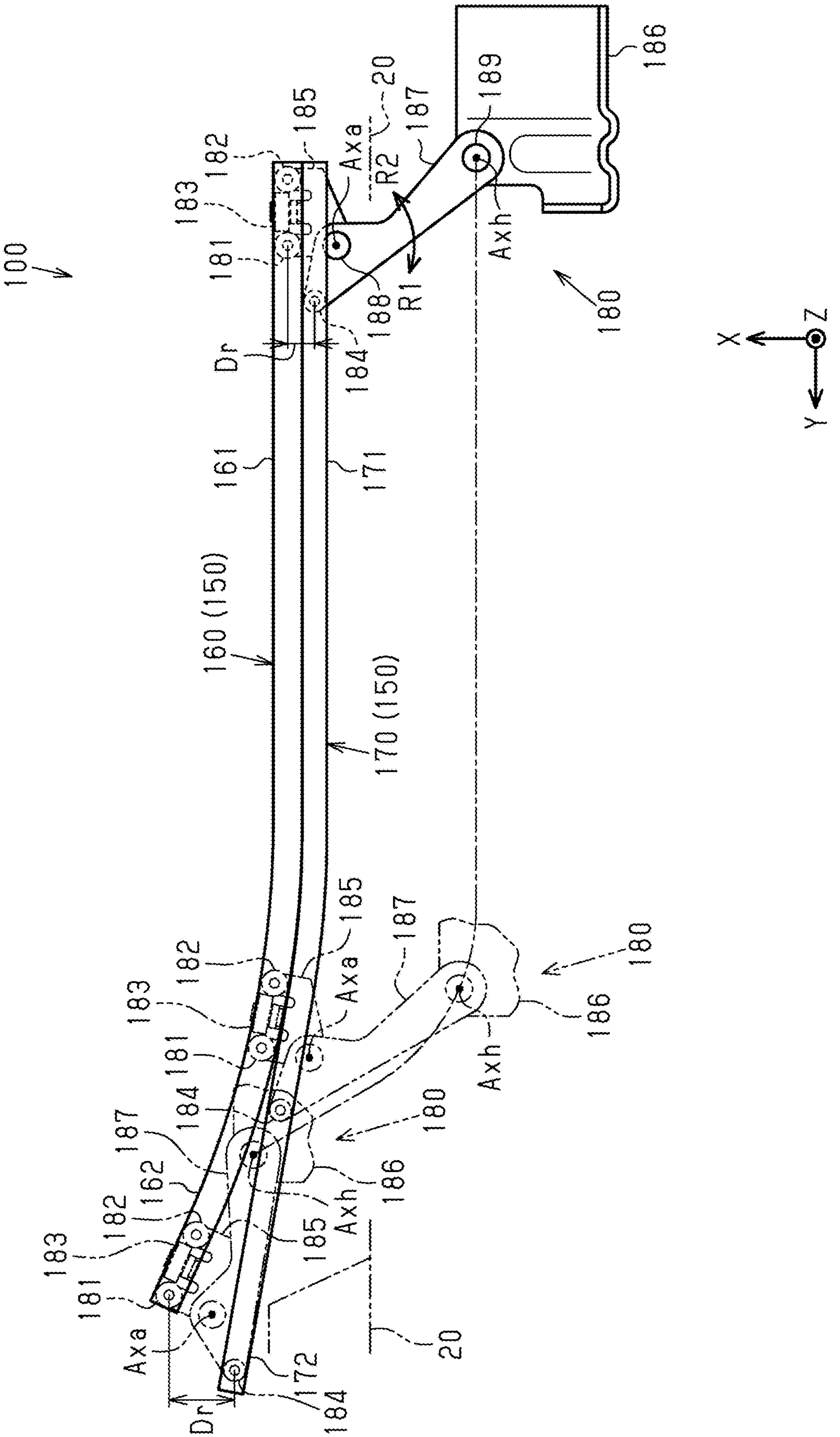
FIG. 5 is a plan view of the lower rail and the lower roller unit of the sliding door support device illustrated in FIG. 1.

As indicated by solid lines in FIG. 5, in a case where the sliding door 30 is disposed at the fully open position, the lower roller unit 180 is located near the rear end of the lower rail 150. At this time, the arm axis Axa is positioned outward in the width direction with respect to the rotation axis of the second guide roller 184. In addition, the hinge axis Axh is positioned outward in the width direction with respect to the arm axis Axa. Therefore, the hinge axis Axh is positioned outward in the width direction with respect to the rotation axis of the second guide roller 184. Furthermore, the interval (hereinafter, "inter-axis distance Dr") in the width direction between the rotation axis of the first guide roller 181 and the rotation axis of the second guide roller 184 is the shortest. That is, the coupling arm 187 is rotated to the maximum in the first rotation direction R1 with respect to the roller support portion 185. Therefore, the interval between the rotation axis of the first guide roller 181 and the hinge axis Axh is the maximum. In addition, the coupling arm 187 takes a posture extending rearward as proceeding outward in the width direction with reference to the proximal end portion. As a result, the door bracket 186 of the lower roller unit 180 is located rearmost and outermost in the width direction.

In a case where the sliding door 30 is closed from the fully open position, the lower roller unit 180 moves from the rear end toward the front end of the lower rail 150. At this time, the two first guide rollers 181 and 182 and the support roller 183 roll on the first rail 160, and the second guide roller 184 rolls on the second rail 170.

First, the two first guide rollers 181 and 182 move along the first straight portion 161 of the first rail 160, and the second guide roller 184 moves along the second straight portion 171 of the second rail 170. In this case, the two first guide rollers 181 and 182 and the second guide roller 184 move forward together. For this reason, the position of the lower roller unit 180 in the width direction does not substantially change. In addition, since the inter-axis distance Dr between the first guide roller 181 and the second guide roller 184 does not substantially change, the coupling arm 187 does not rotate with respect to the roller support portion 185. As a result, the relative positional relationship among the roller support portion 185, the door bracket 186, and the coupling arm 187 does not substantially change.

Subsequently, the two first guide rollers 181 and 182 move along the first curved portion 162 of the first rail 160, and the second guide roller 184 moves along the second curved portion 172 of the second rail 170. In this case, the two first guide rollers 181 and 182 and the second guide roller 184 move inward in the width direction while moving forward. For this reason, the position of the lower roller unit 180 changes inward in the width direction. Furthermore, in this case, the moving direction of the two first guide rollers 181 and 182 is different from the moving direction of the second guide roller 184. Specifically, the moving direction of the two first guide rollers 181 and 182 is directed inward in the width direction with respect to the moving direction of the second guide roller 184. For this reason, as the lower roller unit 180 approaches the front end of the lower rail 150, the inter-axis distance Dr between the first guide roller 181 and the second guide roller 184 increases. That is, by the coupling arm 187 rotating in the second rotation direction R2 with respect to the roller support portion 185, the interval between the rotation axis of the first guide roller 181 and the hinge axis Axh gradually decreases. As a result, the door bracket 186 of the lower roller unit 180 moves inward in the width direction as the door bracket moves forward. Here, a dash-dotted line in FIG. 5 indicates the movement trajectory of the hinge axis Axh with respect to the movement of the lower roller unit 180.

When the lower roller unit 180 moves to the vicinity of the front end of the lower rail 150, the arm axis Axa moves inward in the width direction with respect to the rotation axis of the second guide roller 184. Furthermore, the inter-axis distance Dr between the first guide roller 181 and the second guide roller 184 is the longest. That is, the coupling arm 187 rotates to the maximum in the second rotation direction R2 with respect to the roller support portion 185, and the interval between the rotation axis of the first guide roller 181 and the hinge axis Axh is minimized. In addition, the coupling arm 187 takes a posture extending rearward with reference to the proximal end portion. In other words, the coupling arm 187 takes a posture along the second curved portion 172 of the second rail 170. As a result, the door bracket 186 of the lower roller unit 180 is located foremost and innermost in the width direction. Therefore, at least a part of the door bracket 186 is disposed below the first rail 160 and the second rail 170. That is, when viewed from above, at least a part of the door bracket 186 is hidden by the first rail 160 and the second rail 170.

When the lower roller unit 180 moves to the vicinity of the front end of the lower rail 150, the door bracket 125 of the upper roller unit 120 moves to the vicinity of the front end of the upper rail 110. Similarly, the door bracket 125 of the center roller unit 140 moves to the vicinity of the front end of the center rail 130. Here, the postures of the door bracket 125 of the upper roller unit 120, the door bracket 125 of the center roller unit 140, and the door bracket 186 of the lower roller unit 180 are maintained substantially constant. Therefore, at the time of closing the sliding door 30, the sliding door 30 moves to the fully closed position with the side surface facing the width direction.

The case of closing the sliding door 30 has been described in the above description, but the case of opening the sliding door 30 is also substantially similar except that the moving directions of the sliding door 30 and the components of the door support device 100 are opposite.

Effects of First Embodiment (1-1) In a case where the sliding door 30 moves between the fully closed position and the fully open position as illustrated in FIG. 5, the state where the hinge axis Axh is positioned in the opening direction with respect to the rotation axes of the two first guide rollers 181 and 182 is maintained. In other words, in a case where the sliding door 30 moves between the fully closed position and the fully open position, the positional relationship in the front-rear direction between the hinge axis Axh and the rotation axes of the two first guide rollers 181 and 182 does not change. Specifically, the state where the hinge axis Axh is positioned forward of the two first guide rollers 181 and 182 and the state where the hinge axis Axh is positioned rearward of the two first guide rollers 181 and 182 are not switched to each other. Therefore, the door support device 100 can implement a smooth opening and closing operation of the sliding door 30.

(1-2) As indicated by solid lines in FIG. 5, in the door support device 100, when the sliding door 30 is disposed at the fully open position, the hinge axis Axh is positioned in the opening direction with respect to the rotation axes of the two first guide rollers 181 and 182. Therefore, the door support device 100 can largely open the door opening 21 when the sliding door 30 is disposed at the fully open position.

(1-3) The occupied space of the lower rail 150 is shorter in length in the width direction than the occupied space of the upper rail 110 and the center rail 130. For this reason, it is possible to effectively handle the space below the passenger compartment of the vehicle 10 while interference with the lower rail 150 is avoided. For example, it is possible to dispose a slope and a step or to dispose a large battery in the space.

(1-4) As illustrated in FIG. 5, in a case where the lower roller unit 180 moves along the lower rail 150, the two first guide rollers 181 and 182 move along the first rail 160, and the second guide roller 184 moves along the second rail 170. That is, in a case where the lower roller unit 180 moves along the lower rail 150, the inter-axis distance Dr between the first guide roller 181 and the second guide roller 184 changes depending on the position of the lower roller unit 180 with respect to the lower rail 150. As a result, the coupling arm 187 rotates with respect to the roller support portion 185, so that the position of the door bracket 186 in the width direction changes. In this manner, the door support device 100 can adjust the position of the door bracket 186 in the width direction by using three rollers and two rails.

(1-5) Both the first rail 160 and the second rail 170 are curved inward in the width direction as proceeding forward. Therefore, in a case where there is a structure such as the B pillar of the vehicle body 20 at a position advanced in the closing direction from the end of the second straight portion 171 of the second rail 170 in the closing direction, the door support device 100 can avoid interference between the structure and the second rail 170.

(1-6) In a case where the sliding door 30 is disposed at the fully closed position, in the lower roller unit 180, the arm axis Axa is positioned inward in the width direction with respect to the rotation axis of the second guide roller 184. For this reason, in a case where the sliding door 30 is disposed at the fully closed position, the door support device 100 can easily store the coupling arm 187 inward in the width direction. As a result, the door support device 100 can easily dispose the door bracket 186 inward in the width direction. In this manner, the door support device 100 can reduce the space in the width direction occupied by the device in a case where the sliding door 30 is disposed at the fully closed position.

(1-7) In a case where the sliding door 30 is disposed at the fully open position, in the lower roller unit 180, the arm axis Axa is positioned outward in the width direction with respect to the rotation axis of the second guide roller 184. Furthermore, in a case where the sliding door 30 is disposed at the fully open position, the hinge axis Axh is positioned outward in the width direction with respect to the arm axis Axa. For this reason, in a case where the sliding door 30 is disposed at the fully open position, the door support device 100 can easily deploy the coupling arm 187 outward in the width direction. As a result, the door support device 100 can easily dispose the door bracket 186 outward in the width direction. In this manner, the door support device 100 can provide a wide interval in the width direction between the sliding door 30 disposed at the fully open position and the vehicle body 20.

(1-8) In a case where the sliding door 30 is disposed at the fully closed position, at least a part of the door bracket 186 of the lower roller unit 180 is disposed below the first rail 160 and the second rail 170 of the lower rail 150. For this reason, in a case where the sliding door 30 is disposed at the fully closed position, the door support device 100 can set the position of the door bracket 186 in the width direction to a more inward position. As a result, the door support device 100 can reduce the space in the width direction occupied by the device.

Second Embodiment

Hereinafter, in a door support device 100A according to a second embodiment, portions different from those of the door support device 100 according to the first embodiment will be mainly described. In the following description, the same or similar member configurations as those of the first embodiment are denoted by the same reference numerals, and description thereof is omitted.

Configuration of Second Embodiment

Figure 6:
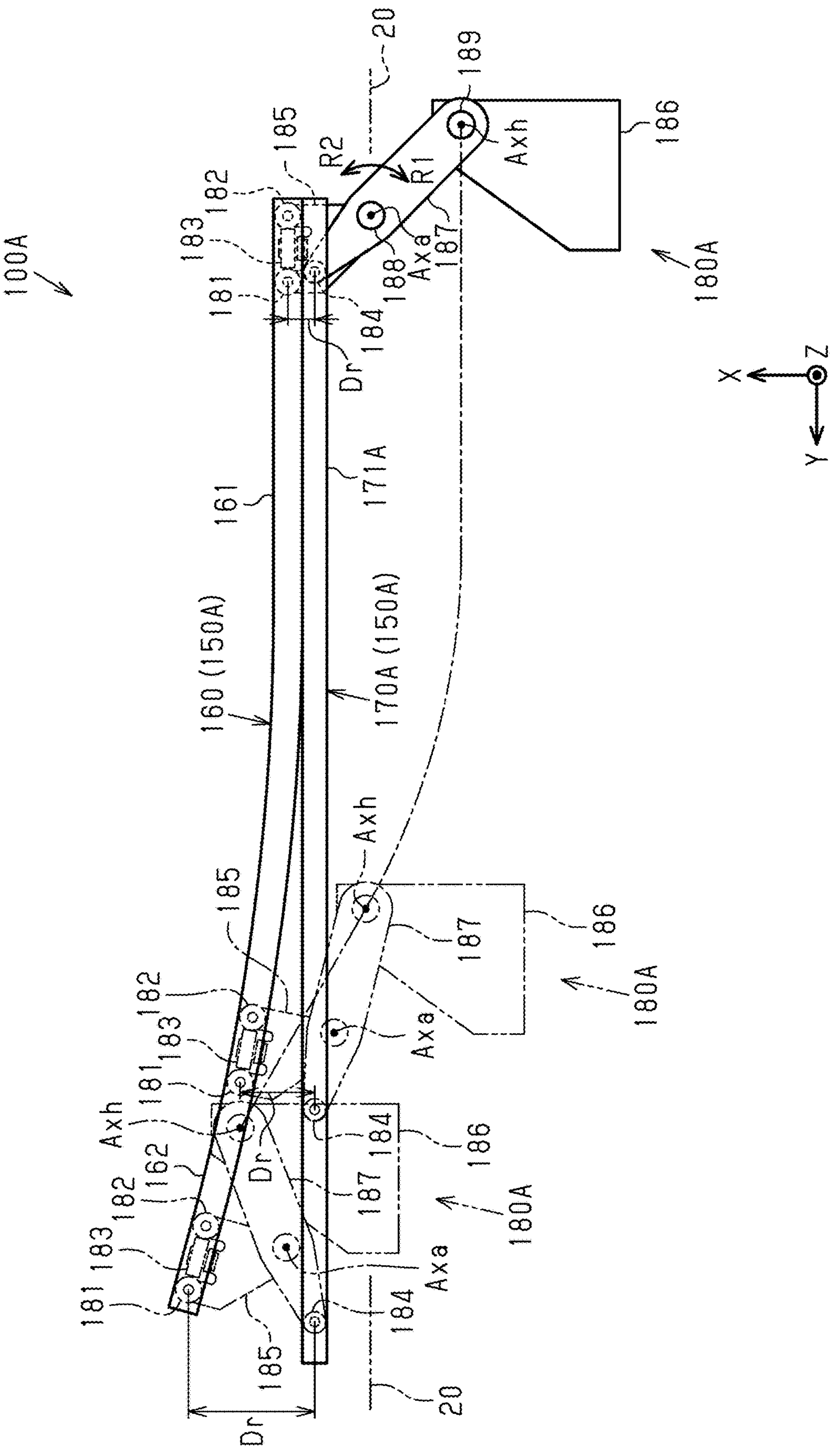
FIG. 6 is a plan view of a lower rail and a lower roller unit of a sliding door support device according to a second embodiment.

As illustrated in FIG. 6, the door support device 100A includes a lower rail 150A and a lower roller unit 180A.

<Lower Rail 150A>

The lower rail 150A includes a first rail 160 and a second rail 170A. The first rail 160 and the second rail 170A have an elongated shape that is long in the front-rear direction. The longitudinal direction of the first rail 160 and the second rail 170A is the front-rear direction. The first rail 160 and the second rail 170A are arranged adjacent to each other in the width direction. The first rail 160 is located inward in the width direction with respect to the second rail 170A. The rear end of the first rail 160 matches the rear end of the second rail 170A, but the front end of the first rail 160 is located rearward of the front end of the second rail 170A. The first rail 160 includes a first straight portion 161 and a first curved portion 162. The second rail 170A includes only a second straight portion 171A extending along the front-rear direction. In other words, the entire second rail 170A extends linearly in the front-rear direction. That is, in the second embodiment, the second rail 170A does not include the second curved portion 172.

<Lower Roller Unit 180A>

The lower roller unit 180A in the second embodiment has substantially the same configuration as the lower roller unit 180A in the first embodiment. That is, the lower roller unit 180A includes two first guide rollers 181 and 182, a support roller 183, a second guide roller 184, a roller support portion 185, a door bracket 186, a coupling arm 187, and two coupling pins 188 and 189. In the second embodiment, a “coupling portion” includes the roller support portion 185 and the coupling arm 187.

When the lower roller unit 180A is viewed from above, the rotation axis of the second guide roller 184, an arm axis Axa, and a hinge axis Axh are arranged on a line. The arm axis Axa is positioned between the rotation axis of the second guide roller 184 and the hinge axis Axh. The distance from the rotation axis of the second guide roller 184 to the arm axis Axa is shorter than the distance from the arm axis Axa to the hinge axis Axh.

Operation of Second Embodiment

Hereinafter, an operation when the sliding door 30 is closed will be described focusing on an action of the lower roller unit 180A.

In a case where the sliding door 30 is disposed at the fully open position, the lower roller unit 180A is located near the rear end of the lower rail 150A. At this time, the arm axis Axa is positioned outward in the width direction with respect to the rotation axis of the second guide roller 184. In addition, the hinge axis Axh is positioned outward in the width direction with respect to the arm axis Axa. Therefore, the hinge axis Axh is positioned outward in the width direction with respect to the rotation axis of the second guide roller 184. Furthermore, the inter-axis distance Dr between the first guide roller 181 and the second guide roller 184 is the shortest. That is, the coupling arm 187 is rotated to the maximum in the first rotation direction R1 with respect to the roller support portion 185. As a result, the door bracket 186 of the lower roller unit 180A is located rearmost and outermost in the width direction.

In a case where the sliding door 30 is closed from the fully open position, the lower roller unit 180A moves from the rear end toward the front end of the lower rail 150A. At this time, the two first guide rollers 181 and 182 and the support roller 183 roll on the first rail 160, and the second guide roller 184 rolls on the second rail 170A.

First, the two first guide rollers 181 and 182 move along the first straight portion 161 of the first rail 160, and the second guide roller 184 moves along the second straight portion 171A of the second rail 170A. In this case, the two first guide rollers 181 and 182 and the second guide roller 184 move forward together. For this reason, the position of the lower roller unit 180A in the width direction does not substantially change. In addition, since the inter-axis distance Dr between the first guide roller 181 and the second guide roller 184 does not substantially change, the coupling arm 187 does not rotate with respect to the roller support portion 185. As a result, the relative positional relationship among the roller support portion 185, the door bracket 186, and the coupling arm 187 does not substantially change.

Subsequently, the two first guide rollers 181 and 182 move along the first curved portion 162 of the first rail 160, and the second guide roller 184 moves along the second straight portion 171A of the second rail 170A. In this case, the two first guide rollers 181 and 182 move inward in the width direction while moving forward, and the second guide roller 184 moves forward. That is, in this case, the moving direction of the two first guide rollers 181 and 182 is directed inward in the width direction with respect to the moving direction of the second guide roller 184. For this reason, as the lower roller unit 180A approaches the front end of the lower rail 150A, the inter-axis distance Dr between the first guide roller 181 and the second guide roller 184 increases. That is, by the coupling arm 187 rotating in the second rotation direction R2 with respect to the roller support portion 185, the interval between the rotation axis of the first guide roller 181 and the hinge axis Axh gradually decreases. As a result, the door bracket 186 of the lower roller unit 180A moves inward in the width direction as the door bracket moves forward. Here, a dash-dotted line in FIG. 6 indicates the movement trajectory of the hinge axis Axh with respect to the movement of the lower roller unit 180A.

When the lower roller unit 180A moves to the vicinity of the front end of the lower rail 150A, the arm axis Axa moves inward in the width direction with respect to the rotation axis of the second guide roller 184. In addition, the hinge axis Axh moves inward in the width direction with respect to the arm axis Axa. Therefore, the hinge axis Axh moves inward in the width direction with respect to the rotation axis of the second guide roller 184. Furthermore, the inter-axis distance Dr between the first guide roller 181 and the second guide roller 184 is the longest. That is, the coupling arm 187 rotates to the maximum in the second rotation direction R2 with respect to the roller support portion 185, and the interval between the rotation axis of the first guide roller 181 and the hinge axis Axh is minimized. As a result, the door bracket 186 of the lower roller unit 180A is located foremost and innermost in the width direction. Therefore, at least a part of the door bracket 186 is disposed below the first rail 160 and the second rail 170A. That is, when viewed from above, at least a part of the door bracket 186 is hidden by the first rail 160 and the second rail 170A.

Effects of Second Embodiment

The second embodiment can obtain effects (1-1) to (1-4), (1-7), and (1-8) of the first embodiment. In addition, the second embodiment can obtain the following effects.

(2-1) The second rail 170A extends linearly. For this reason, the door support device 100A can simplify the shape of the second rail 170A as compared with the case where the curved portion is provided in both the first rail 160 and the second rail 170A.

(2-2) In a case where the sliding door 30 is disposed at the fully closed position, in the lower roller unit 180A, the arm axis Axa is positioned inward in the width direction with respect to the rotation axis of the second guide roller 184. In addition, in the lower roller unit 180A, the hinge axis Axh is positioned inward in the width direction with respect to the arm axis Axa. For this reason, in a case where the sliding door 30 is disposed at the fully closed position, the door support device 100 can easily store the coupling arm 187 inward in the width direction. As a result, the door support device 100A can easily dispose the door bracket 186 inward in the width direction. In this manner, the door support device 100A can reduce the space in the width direction occupied by the device in a case where the sliding door 30 is disposed at the fully closed position.

Third Embodiment

Hereinafter, in a door support device 100B according to a third embodiment, portions different from those of the door support device 100 according to the first embodiment will be mainly described. In the following description, the same or similar member configurations as those of the first embodiment are denoted by the same reference numerals, and description thereof is omitted.

Configuration of Third Embodiment

Figure 7:
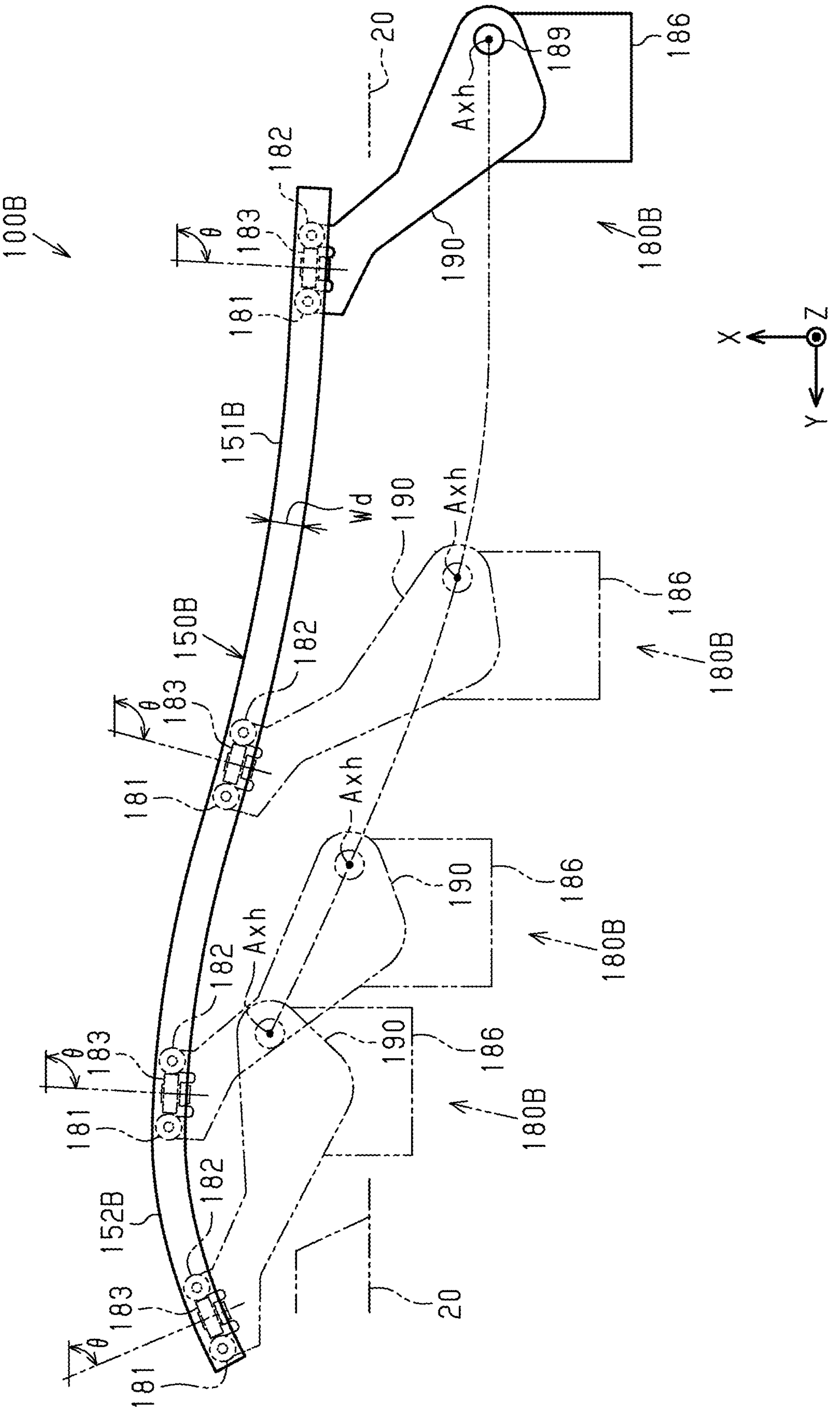
FIG. 7 is a plan view of a lower rail and a lower roller unit of a sliding door support device according to a third embodiment.

As illustrated in FIG. 7, the door support device 100B includes a lower rail 150B and a lower roller unit 180B.

<Lower Rail 150B>

The lower rail 150B has an elongated shape that is long in the front-rear direction. The longitudinal direction of the lower rail 150B is the front-rear direction. The lower rail 150B has an S-shape when viewed from above. The lower rail 150B includes a first curved portion 151B and a second curved portion 152B. The first curved portion 151B is curved inward in the width direction as proceeding forward. The second curved portion 152B is curved outward in the width direction as proceeding forward from the front end of the first curved portion 151B.

The rear end of the first curved portion 151B is located outward in the width direction with respect to the front end of the second curved portion 152B. When the lower rail 150B is viewed from above, the rear end portion of the first curved portion 151B is inclined with respect to the front-rear direction. Specifically, the rear end portion of the first curved portion 151B extends outward in the width direction as proceeding rearward, which is the opening direction. The boundary portion between the first curved portion 151B and the second curved portion 152B is curved so as to protrude inward in the width direction. In other words, the boundary portion between the first curved portion 151B and the second curved portion 152B has an arc shape protruding inward in the width direction. The curvature radius of the second curved portion 152B is smaller than the curvature radius of the first curved portion 151B. In addition, the width Wd near the rear end and the width Wd near the front end of the lower rail 150B are preferably narrower than the width Wd of the intermediate portion in the longitudinal direction of the lower rail 150B. Here, the width Wd of the lower rail 150B is the interval between two side walls intersecting the width direction in the lower rail 150B.

<Lower Roller Unit 180B>

The lower roller unit 180B includes two guide rollers 181 and 182, a support roller 183, a door bracket 186, a coupling pin 189, and a coupling portion 190.

The coupling portion 190 has a plate shape. The coupling portion 190 has an elongated shape in plan view from above. The coupling portion 190 rotatably supports the two guide rollers 181 and 182 and the support roller 183 at the proximal end portion. At this time, the rotation axes of the two guide rollers 181 and 182 extend in the vertical direction. The rotation axis of the support roller 183 is orthogonal to the rotation axes of the two guide rollers 181 and 182. The distal end portion of the coupling portion 190 is coupled to the door bracket 186 by the coupling pin 189 extending in the vertical direction. The coupling portion 190 is rotatable relative to the door bracket 186 about a rotation axis extending in the vertical direction. In the following description, the rotation axis of the coupling portion 190 and the door bracket 186 is referred to as a "hinge axis Axh".

The two guide rollers 181 and 182 and the support roller 183 of the lower roller unit 180B are engaged with the lower rail 150B. Specifically, the two guide rollers 181 and 182 and the support roller 183 are arranged in the longitudinal direction of the lower rail 150B. The two guide rollers 181 and 182 and the support roller 183 of the lower roller unit 180B can thus roll on the lower rail 150B. Among the two guide rollers 181 and 182, the guide roller 181 located in the opening direction corresponds to an "open-side guide roller", and the guide roller 182 located in the closing direction corresponds to a "close-side guide roller".

Operation of Third Embodiment

Hereinafter, an operation when the sliding door 30 is closed will be described focusing on an action of the lower roller unit 180B.

In a case where the sliding door 30 is disposed at the fully open position, the lower roller unit 180B is located near the rear end of the lower rail 150B. At this time, the hinge axis Axh is positioned rearward of the rotation axes of both of the two guide rollers 181 and 182. In addition, the door bracket 186 of the lower roller unit 180B is located rearmost and outermost in the width direction. In the following description, the angle formed between the rotation axis of the support roller 183 and the front-rear direction is referred to as an "angle θ of the coupling portion 190". In a case where the lower roller unit 180B is located near the rear end of the lower rail 150B, the angle θ of the coupling portion 190 is close to a right angle.

In a case where the sliding door 30 is closed from the fully open position, the lower roller unit 180B moves from the rear end toward the front end of the lower rail 150B. At this time, the two guide rollers 181 and 182 and the support roller 183 roll on the lower rail 150B.

Here, in a case where the two guide rollers 181 and 182 move in the direction along the front-rear direction while the angle θ of the coupling portion 190 is maintained constant, the position of the hinge axis Axh in the width direction does not change. On the other hand, in a case where the two guide rollers 181 and 182 move inward in the width direction as advancing forward while the angle θ of the coupling portion 190 is maintained constant, the position of the hinge axis Axh changes inward in the width direction. On the other hand, in a case where the two guide rollers 181 and 182 move outward in the width direction as advancing forward while the angle θ of the coupling portion 190 is maintained constant, the position of the hinge axis Axh changes outward in the width direction.

In addition, in a case where the moving directions of the two guide rollers 181 and 182 gradually change inward in the width direction in the closing operation of the sliding door 30, the angle θ of the coupling portion 190 increases. In this case, the position of the hinge axis Axh is likely to change outward in the width direction. On the other hand, in a case where the moving directions of the two guide rollers 181 and 182 gradually change outward in the width direction, the angle θ of the coupling portion 190 decreases. In this case, the position of the hinge axis Axh is likely to change inward in the width direction.

In this manner, in the third embodiment, the position of the hinge axis Axh in the width direction is determined by both the movement of the two guide rollers 181 and 182 in the front-rear direction and the displacement of the two guide rollers 181 and 182 in the width direction due to the movement. Therefore, in a case where the two guide rollers 181 and 182 move along the first curved portion 151B and the second curved portion 152B of the lower rail 150B, the hinge axis Axh moves as indicated by a dash-dotted line in FIG. 7. Details will be described below.

In a case where the two guide rollers 181 and 182 move along the first curved portion 151B, first, the two guide rollers 181 and 182 move inward in the width direction as advancing forward. At this time, the angle θ of the coupling portion 190 gradually increases. The hinge axis Axh thus moves forward. Thereafter, the two guide rollers 181 and 182 continue to move inward in the width direction as advancing forward, and the angle θ of the coupling portion 190 gradually decreases. For this reason, the hinge axis Axh moves inward in the width direction as proceeding forward. In a case where the two guide rollers 181 and 182 move along the second curved portion 152B, the two guide rollers 181 and 182 move outward in the width direction as advancing forward. Here, in this case, the angle θ of the coupling portion 190 rapidly decreases. For this reason, the hinge axis Axh continues to move inward in the width direction as proceeding forward.

When the upper roller unit 120 moves to the vicinity of the front end of the lower rail 150B, the sliding door 30 is disposed at the fully closed position. At this time, the hinge axis Axh is positioned rearward of the rotation axes of both of the two guide rollers 181 and 182. In addition, the hinge axis Axh is closest to the lower rail 150B in the width direction.

When the sliding door 30 is closed, the hinge axis Axh moves forward and inward in the width direction. As a result, in a case where the sliding door 30 is disposed at the fully closed position, the door bracket 186 of the lower roller unit 180B is located foremost and innermost in the width direction in the movement range.

Furthermore, in a case where the sliding door 30 is closed from the fully open position toward the fully closed position, the positional relationship between the hinge axis Axh and the rotation axes of the guide rollers 181 and 182 in the front-rear direction is not switched. That is, in a case where the sliding door 30 moves between the fully open position and the fully closed position, the state where the hinge axis Axh is positioned rearward of both of the rotation axes of the two guide rollers 181 and 182 is maintained.

Effects of Third Embodiment

The third embodiment can obtain effects (1-1) to (1-3) of the first embodiment. In addition, the third embodiment can obtain the following effects.

(3-1) The door support device 100B moves the lower roller unit 180B along the single lower rail 150B, whereby it is possible to move the door bracket 186 inward in the width direction as the door bracket advances in the closing direction.

(3-2) The width Wd of the front end portion and the rear end portion of the lower rail 150B is narrower than that of the other portions. For this reason, in a case where the lower roller unit 180B is located near the front end and the rear end of the lower rail 150B, the two first guide rollers 181 and 182 are less likely to move in the width direction as compared to the case where the lower roller unit 180B is located at the intermediate portion of the lower rail 150B. That is, in a case where the lower roller unit 180B is located near the front end and the rear end of the lower rail 150B, the posture of the lower roller unit 180B is more likely to be stabilized as compared to the case where the lower roller unit 180B is located at the intermediate portion of the lower rail 150B. Therefore, the door support device 100B can stabilize the posture of the lower portion of the front end of the sliding door 30 when the sliding door 30 is disposed at the fully open position or the fully closed position.

(3-3) The magnitude of the curvature radius of the first curved portion 151B and the second curved portion 152B of the lower rail 150C is related to the amount of change in the inclination of the coupling portion 190 when the sliding door 30 moves by a unit length in the front-rear direction. For example, in a case where the two first guide rollers 181 and 182 roll on a curved portion with a large curvature radius, the inclination of the coupling portion 190 does not change much. On the other hand, in a case where the two first guide rollers 181 and 182 roll on a curved portion with a small curvature radius, the inclination of the coupling portion 190 largely changes. In this regard, in the door support device 100B, the curvature radius of the second curved portion 152B located in the closing direction of the lower rail 150B is smaller than the curvature radius of the first curved portion 151B located in the opening direction of the lower rail 150B. For this reason, when the sliding door 30 moves near the fully closed position, the inclination of the coupling portion 190 largely changes. As a result, the door support device 100B can largely move the door bracket 186 in the width direction when the sliding door 30 moves near the fully closed position. Therefore, the door support device 100B can set the movement trajectory of the sliding door 30 moving between the fully closed position and the fully open position as a trajectory without discomfort.

(3-4) The boundary portion between the first curved portion 151B and the second curved portion 152B in the lower rail 150B is curved so as to protrude inward in the width direction. For this reason, the two first guide rollers 181 and 182 of the lower roller unit 180B can smoothly roll on the boundary portion between the first curved portion 151B and the second curved portion 152B. In other words, the two first guide rollers 181 and 182 of the lower roller unit 180B can smoothly roll on a portion in which the longitudinal direction of the lower rail 150B largely changes. The door support device 100B can thus smoothly move the lower roller unit 180B with respect to the lower rail 150B.

(3-5) In the lower rail 150B, the end of the first curved portion 151B in the opening direction extends outward in the width direction as proceeding in the opening direction. The door support device 100B can thus prevent the sliding door 30 from approaching the vehicle body 20 in the width direction when the sliding door 30 moves in the opening direction near the fully open position.

Fourth Embodiment

Hereinafter, in a door support device 100C according to a fourth embodiment, portions different from those of the door support device 100 according to the first embodiment will be mainly described. In the following description, the same or similar member configurations as those of the first embodiment are denoted by the same reference numerals, and description thereof is omitted.

Configuration of Fourth Embodiment

Figure 8:
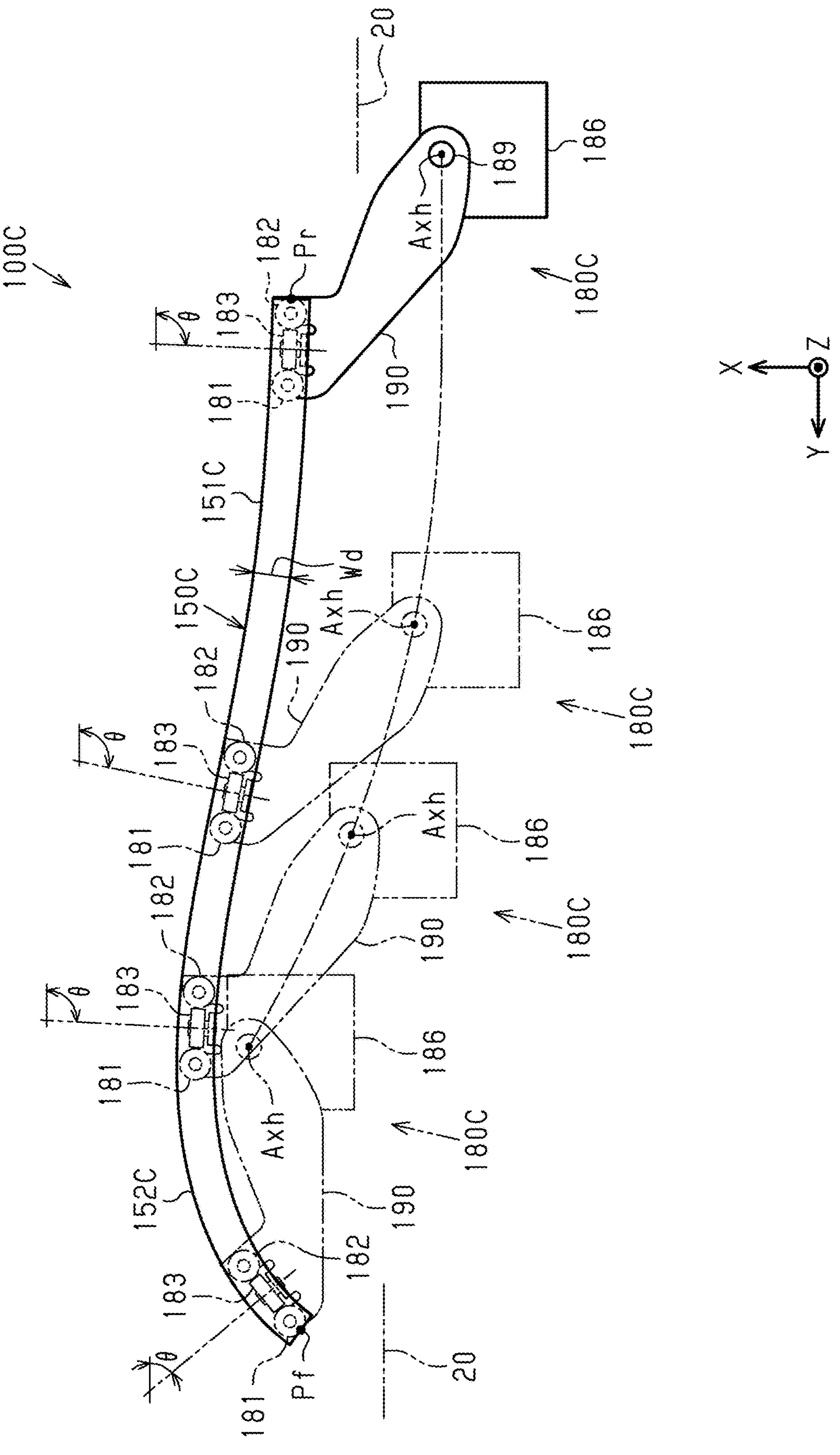
FIG. 8 is a plan view of a lower rail and a lower roller unit of a sliding door support device according to a fourth embodiment.

As illustrated in FIG. 8, the door support device 100C includes a lower rail 150C and a lower roller unit 180C.

<Lower Rail 150C>

The lower rail 150C has an elongated shape that is long in the front-rear direction. The longitudinal direction of the lower rail 150C is the front-rear direction. The lower rail 150C has an S-shape when viewed from above. The lower rail 150C includes a first curved portion 151C and a second curved portion 152C. The first curved portion 151C is curved inward in the width direction as proceeding forward. The second curved portion 152C is curved outward in the width direction as proceeding forward from the front end of the first curved portion 151C.

The rear end portion, which is an end of the first curved portion 151C in the opening direction, is located inward in the width direction with respect to the front end portion, which is an end of the second curved portion 152C in the closing direction. In the fourth embodiment, the front end portion of the second curved portion 152C is a portion of the lower rail 150C located outermost in the width direction. When the lower rail 150C is viewed from above, the rear end portion of the first curved portion 151C is inclined with respect to the front-rear direction. Specifically, the rear end portion of the first curved portion 151C extends outward in the width direction as proceeding rearward, which is the opening direction. The boundary portion between the first curved portion 151C and the second curved portion 152C is curved so as to protrude inward in the width direction. The curvature radius of the second curved portion 152C is smaller than the curvature radius of the first curved portion 151C. Furthermore, the curvature radius of the second curved portion 152C gradually decreases as proceeding forward.

<Lower Roller Unit 180C>

The lower roller unit 180C includes two guide rollers 181 and 182, a support roller 183, a door bracket 186, a coupling pin 189, and a coupling portion 190.

The coupling portion 190 has a plate shape. The coupling portion 190 has an elongated shape in plan view from above. The coupling portion 190 rotatably supports the two guide rollers 181 and 182 and the support roller 183 at the proximal end portion. At this time, the rotation axes of the two guide rollers 181 and 182 extend in the vertical direction. The rotation axis of the support roller 183 is orthogonal to the rotation axes of the two guide rollers 181 and 182. The distal end portion of the coupling portion 190 is coupled to the door bracket 186 by the coupling pin 189 whose axial direction is the vertical direction. The coupling portion 190 is rotatable relative to the door bracket 186 about a rotation axis extending in the vertical direction. In the following description, the rotation axis of the coupling portion 190 and the door bracket 186 is referred to as a "hinge axis Axh".

The two guide rollers 181 and 182 and the support roller 183 of the lower roller unit 180C are engaged with the lower rail 150C. Specifically, the two guide rollers 181 and 182 and the support roller 183 are arranged in the longitudinal direction of the lower rail 150C. The two guide rollers 181 and 182 and the support roller 183 of the lower roller unit 180C can thus roll on the lower rail 150C.

Operation of Fourth Embodiment

Hereinafter, an operation when the sliding door 30 is closed will be described focusing on an action of the lower roller unit 180C.

In a case where the sliding door 30 is disposed at the fully open position, the lower roller unit 180C is located near the rear end of the lower rail 150C. At this time, the hinge axis Axh is positioned rearward of the rotation axes of both of the two guide rollers 181 and 182, and is positioned outward in the width direction with respect to the rotation axes of both of the two guide rollers 181 and 182. In addition, the door bracket 186 of the lower roller unit 180C is located rearmost and outermost in the width direction in the movement range. In a case where the lower roller unit 180C is located near the rear end of the lower rail 150C, the angle θ of the coupling portion 190 is close to a right angle.

In a case where the sliding door 30 is closed from the fully open position, the lower roller unit 180C moves from the rear end toward the front end of the lower rail 150C. At this time, the two guide rollers 181 and 182 and the support roller 183 roll on the lower rail 150C.

Here, in a case where the two guide rollers 181 and 182 move in the direction along the front-rear direction while the angle θ of the coupling portion 190 is maintained constant, the position of the hinge axis Axh in the width direction does not change. On the other hand, in a case where the two guide rollers 181 and 182 move inward in the width direction as advancing forward while the angle θ of the coupling portion 190 is maintained constant, the position of the hinge axis Axh changes inward in the width direction. On the other hand, in a case where the two guide rollers 181 and 182 move outward in the width direction as advancing forward while the angle θ of the coupling portion 190 is maintained constant, the position of the hinge axis Axh changes outward in the width direction.

In addition, in a case where the moving directions of the two guide rollers 181 and 182 gradually change inward in the width direction in the closing operation of the sliding door 30, the angle θ of the coupling portion 190 increases. In this case, the position of the hinge axis Axh is likely to change outward in the width direction. On the other hand, in a case where the moving directions of the two guide rollers 181 and 182 gradually change outward in the width direction, the angle θ of the coupling portion 190 decreases. In this case, the position of the hinge axis Axh is likely to change inward in the width direction.

In this manner, in the fourth embodiment, the position of the hinge axis Axh in the width direction is determined by both the movement of the two guide rollers 181 and 182 in the front-rear direction and the displacement of the two guide rollers 181 and 182 in the width direction due to the movement. Therefore, in a case where the two guide rollers 181 and 182 move along the first curved portion 151C and the second curved portion 152C of the lower rail 150C, the hinge axis Axh moves as indicated by a dash-dotted line in FIG. 8. Details will be described below.

In a case where the two guide rollers 181 and 182 move along the first curved portion 151C, first, the two guide rollers 181 and 182 move inward in the width direction as advancing forward. At this time, the angle θ of the coupling portion 190 gradually increases. The hinge axis Axh thus moves forward. Thereafter, the two guide rollers 181 and 182 continue to move inward in the width direction as advancing forward, and the angle θ of the coupling portion 190 gradually decreases. For this reason, the hinge axis Axh moves inward in the width direction as proceeding forward. In a case where the two guide rollers 181 and 182 move along the second curved portion 152C, the two guide rollers 181 and 182 move outward in the width direction as advancing forward. Here, in this case, the angle θ of the coupling portion 190 rapidly decreases. For this reason, the hinge axis Axh continues to move inward in the width direction as proceeding forward.

When the upper roller unit 120 moves to the vicinity of the front end of the lower rail 150C, the sliding door 30 is disposed at the fully closed position. At this time, the hinge axis Axh is positioned rearward of the rotation axes of both of the two guide rollers 181 and 182, and is positioned inward in the width direction with respect to the rotation axis of the guide roller 181. That is, the hinge axis Axh is positioned inward in the width direction with respect to the front end portion of the lower rail 150C, which is a portion of the lower rail 150C located outermost in the width direction. Furthermore, a line segment connecting a point Pf indicating the central portion in the width direction of the front end edge of the lower rail 150C and a point Pr indicating the central portion in the width direction of the rear end edge of the lower rail 150C is assumed. In this case, the hinge axis Axh is positioned inward in the width direction with respect to the line segment.

When the sliding door 30 is closed, the hinge axis Axh moves forward and inward in the width direction. As a result, in a case where the sliding door 30 is disposed at the fully closed position, the door bracket 186 of the lower roller unit 180C is disposed foremost and innermost in the width direction in the movement range.

Furthermore, in a case where the sliding door 30 is closed from the fully open position toward the fully closed position, the positional relationship between the hinge axis Axh and the rotation axis of the guide roller 181 in the width direction is switched. On the other hand, in a case where the sliding door 30 is closed from the fully open position toward the fully closed position, the positional relationship between the hinge axis Axh and the rotation axes of the guide rollers 181 and 182 in the front-rear direction is not switched. That is, in a case where the sliding door 30 moves between the fully open position and the fully closed position, the state where the hinge axis Axh is positioned rearward of both of the rotation axes of the two guide rollers 181 and 182 is maintained.

Effects of Fourth Embodiment

The fourth embodiment can obtain effects (1-1) to (1-3) of the first embodiment and effects (3-1) to (3-5) of the third embodiment. In addition, the fourth embodiment can obtain the following effects.

(4-1) In a case where the sliding door 30 is disposed at the fully closed position, the hinge axis Axh is positioned inward in the width direction with respect to the front end of the lower rail 150C, which is a portion of the guide rail located outermost in the width direction. For this reason, in a case where the sliding door 30 is disposed at the fully closed position, the door support device 100C can set the position of the door bracket 186 in the width direction to a more inward position. Therefore, the door support device 100C can be housed in a space narrow in the width direction.

(4-2) In a case where the sliding door 30 is disposed at the fully closed position, the hinge axis Axh of the lower roller unit 180C is positioned inward in the width direction with respect to the guide roller 182. For this reason, the door support device 100C can largely move the door bracket 186 outward in the width direction when moving the sliding door 30 toward the fully open position.

(4-3) In a case where the sliding door 30 is disposed at the fully open position, the hinge axis Axh of the lower roller unit 180C is positioned outward in the width direction with respect to the guide roller 182. For this reason, when moving the sliding door 30 toward the fully closed position, the door support device 100C can largely move the door bracket 186 inward in the width direction. That is, in a case where the sliding door 30 is disposed at the fully closed position, the door support device 100C can prevent the door bracket 186 from projecting largely outward in the width direction. As a result, the door support device 100C can be housed in a space narrow in the width direction.

Modifications

The embodiments described above can be modified and implemented as follows. The above embodiments and the following modifications can be implemented in combination with each other within a technically consistent range.

- In the first embodiment, the first rail 160 may be disposed outward in the width direction with respect to the second rail 170. In this case, the bending modes of the first rail 160 and the second rail 170 are preferably appropriately selected. The same applies to the second embodiment.
- In the first embodiment, a gap may be formed between the first straight portion 161 of the first rail 160 and the second straight portion 171 of the second rail 170. In this case, the gap between the first straight portion 161 and the second straight portion 171 may change in the front-rear direction. The same applies to the second embodiment.
- In the first embodiment, the upper roller unit 120, the center roller unit 140, and the lower roller unit 180 may include three or more first guide rollers. The same applies to other embodiments.
- In the first embodiment, the lower rail 150 and the lower roller unit 180 may be applied to the upper rail 110 and the upper roller unit 120, respectively. Similarly, the lower rail 150 and the lower roller unit 180 may be applied to the center rail 130 and the center roller unit 140, respectively. The same applies to other embodiments.
- In the first embodiment, in a case where the sliding door 30 moves between the fully closed position and the fully open position, it is only required that the state where the hinge axis Axh is positioned in the opening direction with respect to the rotation axis of the first guide roller 181 is maintained. That is, in a case where the sliding door 30 moves between the fully closed position and the fully open position, the hinge axis Axh may be positioned in the closing direction with respect to the first guide roller 182. The same applies to other embodiments.

The sliding door 30 may be a door manually operated by a user. That is, the vehicle 10 does not need to include the door drive device 40.

The sliding door 30 may open by moving forward. That is, the sliding door 30 may close by moving rearward.

The sliding door 30 may include a front door that opens and closes the front half of the door opening 21 and a rear door that opens and closes the rear half of the door opening 21. In this case, the door opening 21 is fully closed by the front door and the rear door moving in a direction of approaching each other. On the other hand, the door opening 21 is fully opened by the front door and the rear door moving in a direction away from each other.

Summary of Present Embodiments

The present embodiments include at least the following configuration.

A sliding door support device (100B, 100C) of the present embodiments is applied to a vehicle (10) including a vehicle body (20) having a door opening (21) that is open to a side surface, and a sliding door (30) configured to move between a fully closed position where the door opening (21) is fully closed and a fully open position where the door opening (21) is fully opened, and is configured to cause the vehicle body (20) to support the sliding door (30). Among directions along a front-rear direction of the vehicle (10), a direction in which the sliding door (30) moves to the fully closed position is a closing direction, and a direction in which the sliding door (30) moves to the fully open position is an opening direction. The sliding door support device (100B, 100C) includes a guide rail (150B, 150C) extending in the front-rear direction, and a roller unit (180B, 180C) configured to move the sliding door (30) between the fully closed position and the fully open position by moving along the guide rail (150B, 150C). The roller unit (180B, 180C) includes two guide rollers (181, 182) configured to roll on the guide rail (150B, 150C) in a state of being arranged in the front-rear direction, a door bracket (186) fixed to the sliding door (30), and a coupling portion (190) configured to be coupled to the door bracket (186) so as to rotate relative to the door bracket (186) about a hinge axis (Axh) extending in a vertical direction, and to rotatably support the two guide rollers (181, 182). In a case where the sliding door (30) moves between the fully closed position and the fully open position, the roller unit is configured so that a state where the hinge axis (Axh) is positioned in the opening direction with respect to a rotation axis of at least one of the two guide rollers (181, 182) is maintained, regardless of a position of the sliding door (30). The guide rail (150B, 150C) includes a first curved portion (151B, 151C) that is curved inward in a width direction of the vehicle (10) as proceeding in the closing direction, and a second curved portion (152B, 152C) that is curved outward in the width direction as proceeding in the closing direction from an end of the first curved portion (151B, 151C) in the closing direction.

In a case where the sliding door moves between the fully closed position and the fully open position, the state where the hinge axis is positioned in the opening direction with respect to the rotation axes of the two guide rollers is maintained. In other words, in a case where the sliding door moves between the fully closed position and the fully open position, the positional relationship in the front-rear direction between the hinge axis and the rotation axes of the two guide rollers is not switched. In addition, when the sliding door is disposed at the fully open position, the hinge axis is positioned in the opening direction with respect to the rotation axes of the two guide rollers, so that the sliding door support device can largely open the door opening when the sliding door is disposed at the fully open position. That is, the sliding door support device can reduce the overlap between the sliding door disposed at the fully open position and the door opening in the front-rear direction.

In the present embodiment, in a case where the sliding door (30) moves between the fully closed position and the fully open position, the roller unit (180B, 180C) is preferably configured to maintain a state where the hinge axis (Axh) is positioned in the opening direction with respect to the rotation axes of both of the two guide rollers (181, 182) regardless of the position of the sliding door (30).

The sliding door support device can further reduce the overlap between the sliding door disposed at the fully open position and the door opening in the front-rear direction.

In the present embodiments, when the guide rail (150B, 150C) is viewed in the vertical direction, a curvature radius of the second curved portion (152B, 152C) is preferably smaller than a curvature radius of the first curved portion (151B, 151C).

The magnitude of the curvature radius of the curved portion is related to the amount of change in the inclination of the coupling portion when the sliding door moves by a unit length in the front-rear direction. For example, in a case where two guide rollers roll on a curved portion with a large curvature radius, the inclination of the coupling portion does not change much. On the other hand, in a case where the two guide rollers roll on a curved portion with a small curvature radius, the inclination of the coupling portion largely changes. In this regard, in the sliding door support device, the curvature radius of the second curved portion located in the closing direction of the guide rail is smaller than the curvature radius of the first curved portion located in the opening direction of the guide rail. For this reason, in a case where the sliding door moves near the fully closed position, the inclination of the coupling portion changes more largely than in a case where the sliding door moves near the fully open position. As a result, the sliding door support device can largely move the door bracket in the width direction when the sliding door moves near the fully closed position. Therefore, the sliding door support device can set the movement trajectory of the sliding door moving between the fully closed position and the fully open position as a trajectory without discomfort.

In the guide rail (150B, 150C) of the present embodiments, a boundary portion between the first curved portion (151B, 151C) and the second curved portion (152B, 152C) is preferably curved so as to protrude inward in the width direction.

The two guide rollers can smoothly roll on the boundary portion between the first curved portion and the second curved portion. In other words, the two guide rollers can smoothly roll on a portion in which the longitudinal direction of the guide rail largely changes. The sliding door support device can thus smoothly move the roller unit with respect to the guide rail.

In the present embodiment, in a case where the sliding door (30) is disposed at the fully closed position, the hinge axis (Axh) is preferably positioned inward in the width direction with respect to a portion of the guide rail (150C) located outermost in the width direction.

In the sliding door support device, in a case where the sliding door is disposed at the fully closed position, the position of the door bracket in the width direction can be set to a more inward position. The sliding door support device can thus reduce the space in the width direction occupied by the device in a case where the sliding door is disposed at the fully closed position.

In the present embodiments, the guide roller (181) located in the closing direction among the two guide rollers (181, 182) may be a close-side guide roller (181). It is preferable that the hinge axis (Axh) is positioned outward in the width direction with respect to the close-side guide roller (181) in a case where the sliding door (30) is disposed at the fully open position, and is positioned inward in the width direction with respect to the close-side guide roller (181) in a case where the sliding door (30) is disposed at the fully closed position.

The sliding door support device can largely move the door bracket outward in the width direction when moving the sliding door toward the fully open position. On the other hand, the sliding door support device can largely move the door bracket inward in the width direction when moving the sliding door toward the fully closed position.

In the present embodiments, an end of the first curved portion (151B, 151C) in the opening direction preferably extends outward in the width direction as proceeding in the opening direction.

The sliding door support device can prevent the sliding door from approaching the vehicle body in the width direction when the sliding door moves in the opening direction near the fully open position.

REFERENCE SIGNS LIST

10: Vehicle, 20: Vehicle body, 21: Door opening, 30: Sliding door, 100, 100A, 100B, 100C: Sliding door support device, 150, 150A, 150B, 150C: Lower rail (Guide rail), 151B, 151C: First curved portion, 152B, 152C: Second curved portion, 180, 180A, 180B, 180C: Lower roller unit (Roller unit), 181, 182: Guide roller, 183: Support roller, 184: Second guide roller, 185: Roller support portion (Component of coupling portion), 186: Door bracket, 187: Coupling arm (Component of coupling portion), 188, 189: Coupling pin, 190: Coupling portion, and Axh: Hinge axis

The invention claimed is:

1. A sliding door support device that is applied to a vehicle including a vehicle body having a door opening that is open to a side surface, and a sliding door configured to move between a fully closed position where the door opening is fully closed and a fully open position where the door opening is fully opened, and that is configured to cause the vehicle body to support the sliding door, among directions along a front-rear axis of the vehicle, a direction in which the sliding door moves to the fully closed position being a closing direction, and a direction in which the sliding door moves to the fully open position being an opening direction, the sliding door support device comprising:

a guide rail extending in the front-rear axis; and a roller unit configured to move the sliding door between the fully closed position and the fully open position by moving along the guide rail, wherein the roller unit includes two guide rollers configured to roll on the guide rail in a state of being arranged along the front-rear axis, a door bracket fixed to the sliding door, and a coupling portion configured to be coupled to the door bracket at a first end of the coupling portion so as to rotate relative to the door bracket about a hinge axis at the first end of the coupling portion extending in a vertical direction, and to rotatably support the two guide rollers at a second end of the coupling portion that is different than the first end of the coupling portion, the coupling portion being configured to be attached to the sliding door via the door bracket and about the hinge axis, in a case where the sliding door moves between the fully closed position and the fully open position, a state where the hinge axis is positioned at an opening side with respect to a rotation axis of at least one of the two guide rollers regardless of a position of the sliding door, and the guide rail includes a first curved portion that is curved inward in a width direction of the vehicle as proceeding in the closing direction, and a second curved portion that is curved outward in the width direction as proceeding in the closing direction from an end of the first curved portion in the closing direction.

2. The sliding door support device according to claim 1, wherein in a case where the sliding door moves between the fully closed position and the fully open position, the roller unit is configured to maintain a state where the hinge axis is positioned in the opening direction with respect to rotation axes of both of the two guide rollers regardless of a position of the sliding door.

3. The sliding door support device according to claim 1, wherein when the guide rail is viewed in the vertical direction, a curvature radius of the second curved portion is smaller than a curvature radius of the first curved portion.

4. The sliding door support device according to claim 1, wherein in the guide rail, a boundary portion between the first curved portion and the second curved portion is curved so as to protrude inward in the width direction.

5. The sliding door support device according to claim 1, wherein in a case where the sliding door is disposed at the fully closed position, the hinge axis is positioned inward in the width direction with respect to a portion of the guide rail located outermost in the width direction.

6. The sliding door support device according to claim 1, wherein the guide roller located at a closing side among the two guide rollers is a close-side guide roller, the hinge axis is positioned outward in the width direction with respect to the close-side guide roller in a case where the sliding door is disposed at the fully open position, and the hinge axis is positioned inward in the width direction with respect to the close-side guide roller in a case where the sliding door is disposed at the fully closed position.

7. The sliding door support device according to claim 1, wherein an end of the first curved portion in the opening direction extends outward in the width direction as proceeding in the opening direction.

8. The sliding door support device according to claim 2, wherein when the guide rail is viewed in the vertical direction, a curvature radius of the second curved portion is smaller than a curvature radius of the first curved portion.

9. The sliding door support device according to claim 2, wherein in the guide rail, a boundary portion between the first curved portion and the second curved portion is curved so as to protrude inward in the width direction.

10. The sliding door support device according to claim 2, wherein in a case where the sliding door is disposed at the fully closed position, the hinge axis is positioned inward in the width direction with respect to a portion of the guide rail located outermost in the width direction.

11. The sliding door support device according to claim 2, wherein the guide roller located at a closing side among the two guide rollers is a close-side guide roller, the hinge axis is positioned outward in the width direction with respect to the close-side guide roller in a case where the sliding door is disposed at the fully open position, and the hinge axis is positioned inward in the width direction with respect to the close-side guide roller in a case where the sliding door is disposed at the fully closed position.

12. The sliding door support device according to claim 2, wherein an end of the first curved portion in the opening direction extends outward in the width direction as proceeding in the opening direction.

13. A sliding door support device that is applied to a vehicle including a vehicle body having a door opening that is open to a side surface, and a sliding door configured to move between a fully closed position where the door opening is fully closed and a fully open position where the door opening is fully opened, and that is configured to cause the vehicle body to support the sliding door, among directions along a front-rear axis of the vehicle, a direction in which the sliding door moves to the fully closed position being a closing direction, and a direction in which the sliding door moves to the fully open position being an opening direction, the sliding door support device comprising:

a guide rail extending in the front-rear axis; and a roller unit configured to move the sliding door between the fully closed position and the fully open position by moving along the guide rail, wherein the roller unit includes two guide rollers configured to roll on the guide rail in a state of being arranged along the front-rear axis, a door bracket fixed to the sliding door, and a coupling portion configured to be coupled to the door bracket so as to rotate relative to the door bracket about a hinge axis extending in a vertical direction, and to rotatably support the two guide rollers, in a case where the sliding door moves between the fully closed position and the fully open position, a state where the hinge axis is positioned at an opening side with respect to a rotation axis of at least one of the two guide rollers regardless of a position of the sliding door, the guide rail includes a first curved portion that is curved inward in a width direction of the vehicle as proceeding in the closing direction, and a second curved portion that is curved outward in the width direction as proceeding in the closing direction from an end of the first curved portion in the closing direction, the guide roller located at a closing side among the two guide rollers is a close-side guide roller, the hinge axis is positioned outward in the width direction with respect to the close-side guide roller in a case where the sliding door is disposed at the fully open position, and the hinge axis is positioned inward in the width direction with respect to the close-side guide roller in a case where the sliding door is disposed at the fully closed position.

* * * * *